(12) United States Patent
Hou

(10) Patent No.: US 6,519,841 B1
(45) Date of Patent: Feb. 18, 2003

(54) METHOD OF IC PACKING/UNPACKING FOR PRESERVING AND UPDATING DATA WITHIN THE IC AND THE STRUCTURE THEREOF

(75) Inventor: Chien-Tzu Hou, Fremont, CA (US)

(73) Assignee: Geneticware Co., Ltd., Road Town Tortola (VG)

( * ) Notice: Subject to any disclaimer, the term of this patent is extended or adjusted under 35 U.S.C. 154(b) by 0 days.

(21) Appl. No.: 09/333,106

(22) Filed: Jun. 15, 1999

(51) Int. Cl.[7] .......................... H05K 3/30; H01R 43/00
(52) U.S. Cl. ............................ 29/837; 29/825; 29/832
(58) Field of Search .................................. 361/748, 752, 361/759; 326/8; 220/4.02, 210; 29/825, 830, 832, 837, 842, 845

(56) References Cited

U.S. PATENT DOCUMENTS 5,111,362 A * 5/1992 Flamm et al. .............. 361/395
5,998,858 A * 12/1999 Little et al. ................. 257/678

* cited by examiner

Primary Examiner—Michael Sherry
Assistant Examiner—Scott B Geyer

(57) ABSTRACT

A method of IC packing/unpacking for preserving and updating data stored in the IC and the structure thereof is disclosed. The method is able to encase the IC to prevent intentional piracy and allow data preservation and update. The structure has an upper plate (10) having a trough (12) defined therein; a lower plate (20) detachably connected with the upper plate (10); a PCB (30) sandwiched between the upper plate (10) and the lower plate (20) and forming an electrical connection with the upper plate (10); an interface (60) detachably inserted into the trough (12) and being able to receive data therein; and a controller (50) electrically connected with the interface (60) for coding the interface (60).

2 Claims, 4 Drawing Sheets

METHOD OF IC PACKING/UNPACKING FOR PRESERVING AND UPDATING DATA WITHIN THE IC AND THE STRUCTURE THEREOF

BACKGROUND OF THE INVENTION

1. Field of the Invention

The present invention relates to a method, and more particularly to a method of integrated circuit (IC) packing/unpacking for preserving and updating data stored in the IC and the structure thereof. By the packing method, the data stored in the IC is prevented from theft and copying by others. With such a structure, the operator is able to proceed a data updating process under a safe situation.

2. Description of the Related Art

It is known in the art that IC is used to store data which includes programs and information. By the programs or information stored in the IC, devices such as personal computers are able to process a predetermined function. To enhance the speed and perfection of various functions, designers all try to upgrade the programs they use. Therefore, all kinds of software are developed to the market, and people do benefit from the developed software. However, because the IC itself does not have a defensive system, data and programs stored in the IC may be copied illegally by others by opening its package and reverse engineering.

In order to encourage people to continue to design good and efficient programs, the present invention intends to introduce a method for packing/unpacking IC so that the data stored in the IC will be protected and piracy action is stopped.

Therefore, it is an objective of the invention to provide a method for IC packing/unpacking and a structure thereof to mitigate and/or obviate the aforementioned problems.

SUMMARY OF THE INVENTION

The main objective of the invention is to provide a method for IC packing/unpacking, with which the programs stored in the IC is protected from being stolen and copied.

In order to accomplish the above objective, the method comprises the steps of:

encasing the printed circuit board having an IC inside with pre-coded plates;

generating signals corresponding to the code in the plates; and decoding the coded plates.

In accordance with another aspect of the invention, the structure for accomplishing the above mentioned objective comprises an upper plate having a plurality of coding buttons thereon, a lower plate detachably connected with the upper plate, a printed circuit board (PCB) having an IC inside and sandwiched between the upper plate and the lower plate, a decoder electrically connected with the upper plate and having a plurality of keys protruding therefrom for generating signals corresponding to the coding buttons and a controller electrically connected with the decoder for driving the keys to decode the encased PCB.

Other objects, advantages and novel features of the invention will become more apparent from the following detailed description when taken in conjunction with the accompanying drawings.

DETAILED DESCRIPTION OF PREFERRED EMBODIMENT

Figure 1:
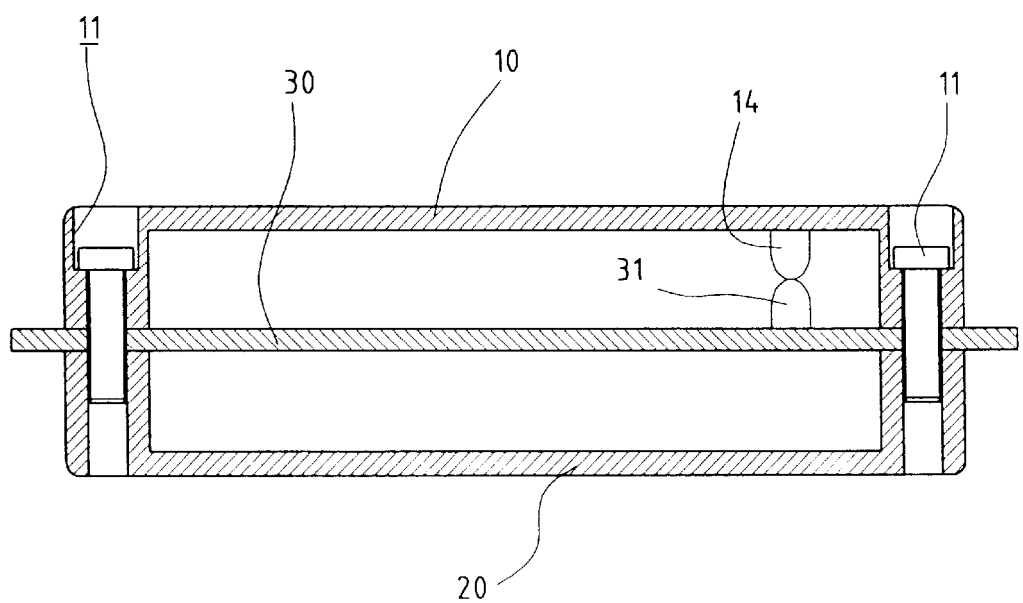
FIG. 1 is a schematic view showing the process of packing a PCB.

Referring to FIG. 1, the method for packing a printed circuit board (PCB) (30) having an IC securely received therein comprises the steps of:

encasing the PCB (30) with an upper plate (10) and a lower plate (20), wherein the PCB (30) is sandwiched between the upper plate (10) and the lower plate (20) and then screws (11) are used to secure the connection between the upper/lower plates (10,20) and the PCB (30), coding the plates;

generating signals corresponding to the code in the plates; and decoding the coded plates.

Figure 2:
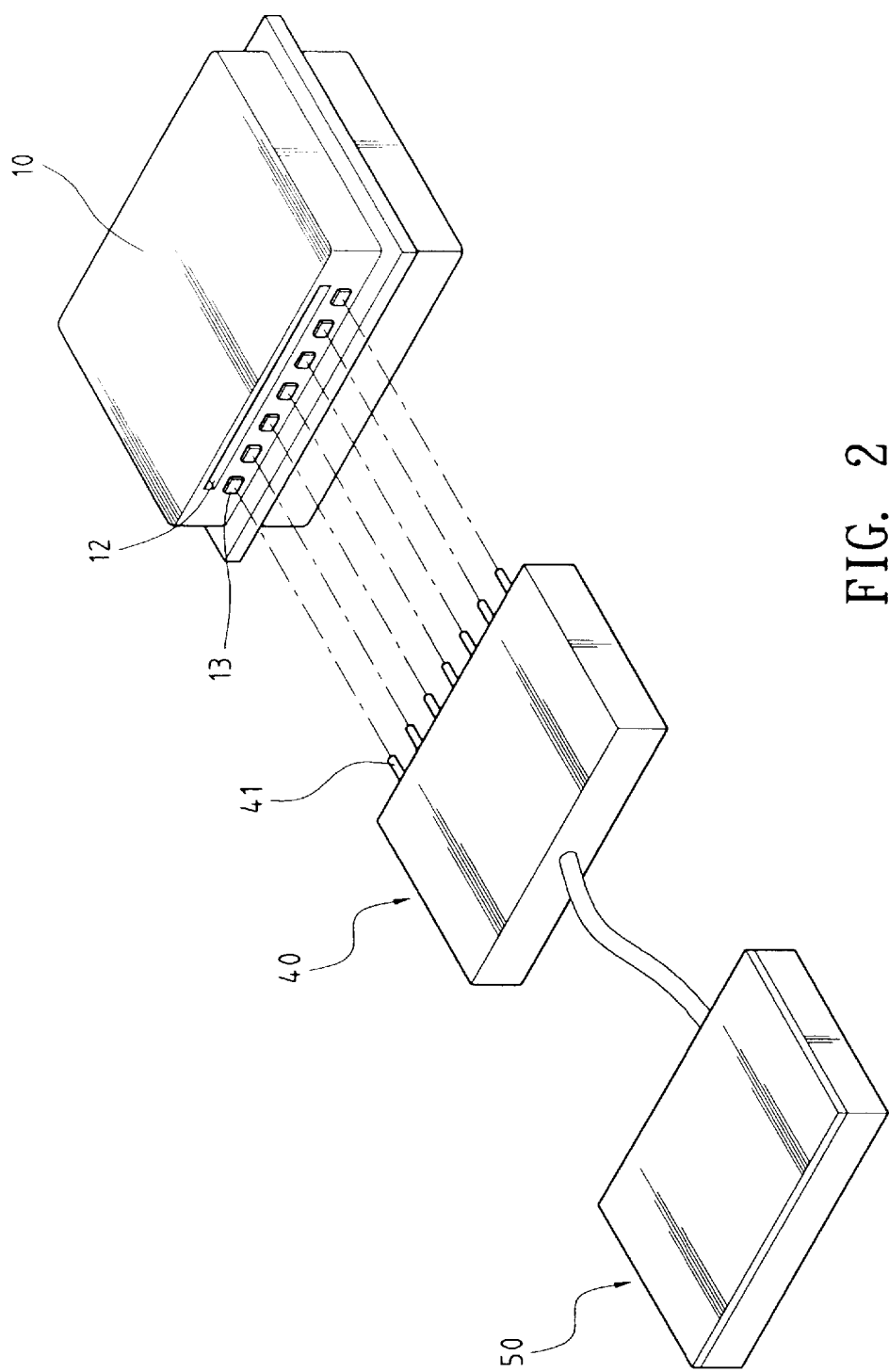
FIG. 2 is a perspective view showing that the PCB is encased by an upper plate and a lower plate and a decoder driven by a controller is able to generate signals for unpacking the encased PCB.

Referring to FIGS. 1 and 2, it is to be noted that the upper plate (10) further has a trough (12) defined therein and a plurality of coding buttons (13) formed below the trough (12) for activating the programs stored in the IC in the PCB (30). Furthermore, to unpack the encased PCB (30), a decoder (40) having a plurality of keys (41) extending therefrom and a,controller (50) electrically connected with the decoder (40) are required, Each key corresponds to one of the coding buttons (13) and is driven by the controller (50). When the unpacking of the encased PCB (30) is necessary for data storage or program updating, the controller (50), preferably a personal computer, a laptop computer or a notebook computer, will generate a signal to activate the decoder (40). The decoder (40), after receiving the signal from the controller (50), will then send out a signal to drive the keys (41) to "punch" the coding buttons (13) within a time period of 100 ms. The coding buttons (13) are predetermined such that after receiving the "punch" by the keys (41), the program stored in the IC will detect whether the sequence of the punch to the coding buttons (13) is correct If the result of the detection shows that the sequence of the punch to the coding buttons (13) is not in the predetermined sequence, then the program stored in the IC will send out a signal to destroy all information in the IC. However, if the sequence of the punch to the coding buttons (13) is in the predetermined sequence, then the program stored in the IC will send out a signal to allow unpacking the encased PCB (30).

As described above, when the detection of the punch to the coding buttons (13) is not in the predetermined sequence, the information stored in the IC will then be destroyed. The purpose of destroying all the information in the IC is to prevent intentional piracy or copy.

Figure 3:
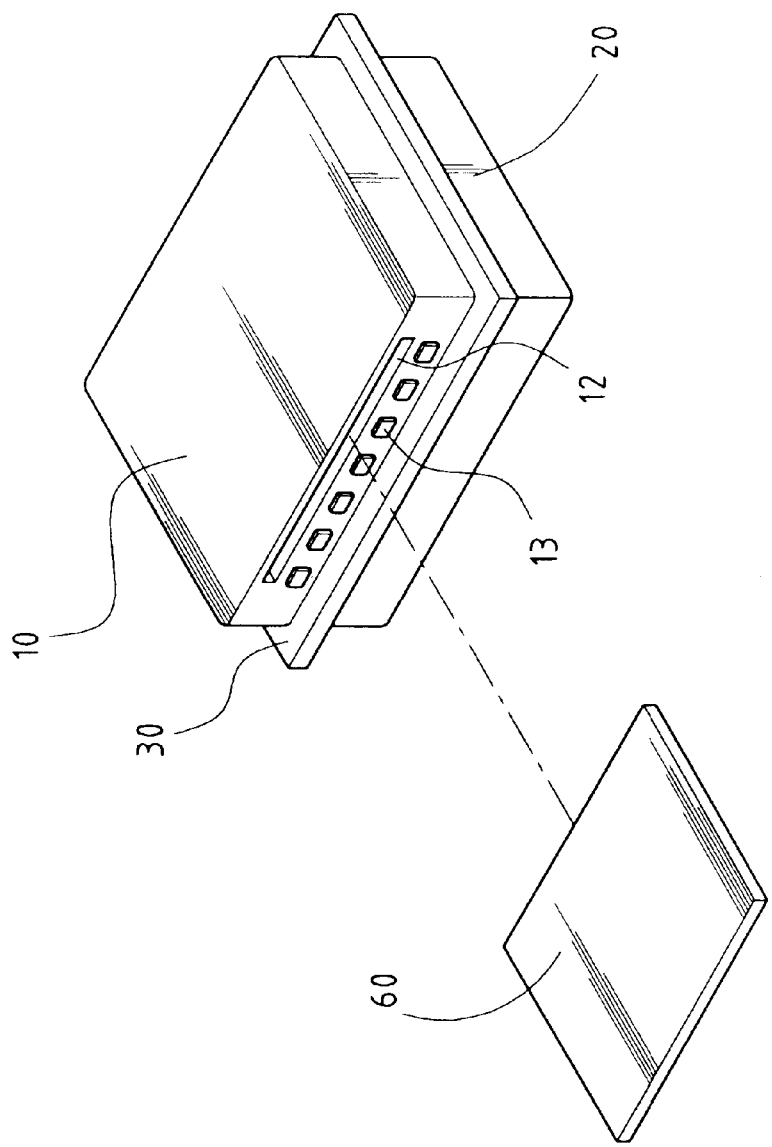
FIG. 3 is a perspective view showing an alternative embodiment of the structure of the invention.
Figure 4:
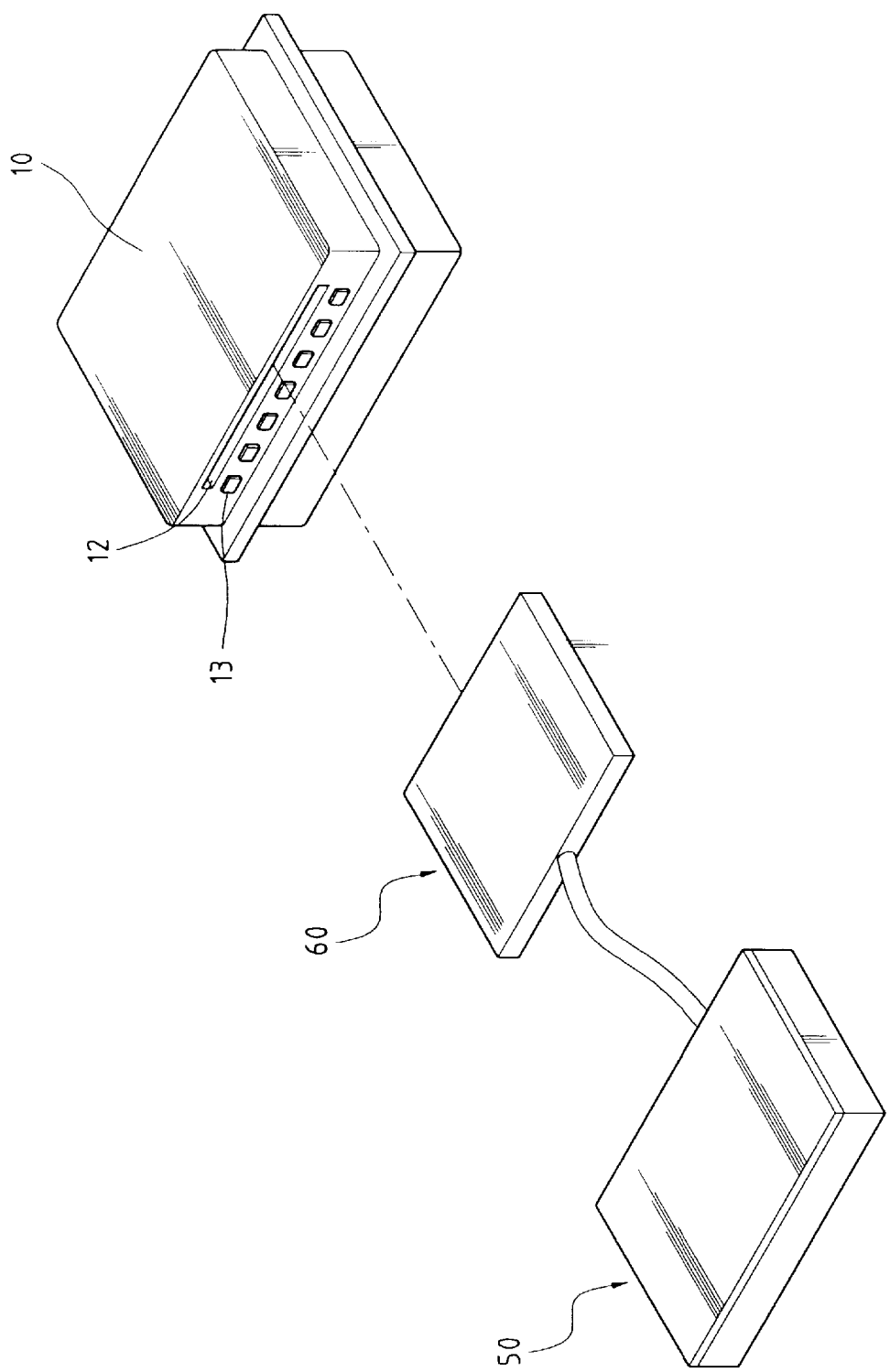
FIG. 4 is a perspective view showing still an alternative embodiment of the structure of the invention.

Referring to FIGS. 3 and 4, another embodiment of maintaining and updating the information stored in the IC is disclosed. When maintaining or updating information in the IC is necessary, an interface (60) (preferably a smart card) enabling the circuit to store information therein is used. The interface, after receiving a command from the controller (50) to have updated information and/or code therein is then inserted into the trough (12). When the interface (60) is inserted into the trough (12), the program in the IC will automatically match with the pre-stored information and/or code in the interface (60). When the result of the match shows that the code or information in the interface (60) is correct, then the upper and lower plates (10,20) are able to be detached. In other words, if the result of the match shows that the code or information in the interface (60) is incorrect, then detaching the upper and lower plates (10,20) will activate the program in the IC to destroy all the information in the IC.

Referring back to FIG. 1, it is to be noted that a first connection (14) is formed on the upper plate (10) and a second connection (31) is formed on the PCB (30) to correspond to the first connection (14). When the PCB (30) is encased between the upper plate (10) and the lower plate (20), the first connection (14) engages with the second connection (31), which form a closed loop. The program in the IC will monitor the closed loop at all times, such that when the code in the program is not decoded first and a force is applied to open the closed loop, the program will automatically destroy all the information in the IC.

From the foregoing description, it is concluded that the method for unpacking the encased IC comprises the steps of:

coding an interface;

matching the coded interface with the code in the IC; and generating signals to allow maintenance to the information in the IC or destroy all the information in the IC.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of protecting and updating data stored in an integrated circuit, comprising the steps of:

encasing a printed circuit board with an upper plate and a lower plate, said printed circuit board being sandwiched between said upper and lower plates;

coding said upper plate with a predetermined sequence of codes;

preparing a plurality of coding buttons;

packing said upper and lower plates to enclose said printed circuit board;

preparing a decoder having a plurality of keys each corresponding to a coding button;

using a controller to activate said decoder and drive said keys to punch said coding buttons for generating an input sequence of codes;

allowing said upper and lower plates to be unpacked if said input sequence matches with said predetermined sequence; and erasing data stored in an integrated circuit on said printed circuit board if said input sequence does not match with said predetermined sequence.

2. A method of protecting and updating data stored in an integrated circuit, comprising the steps of:

encasing a printed circuit board with an upper plate and a lower plate, said printed circuit board being sandwiched between said upper and lower plates;

coding said upper plate with predetermined codes;

preparing an interface trough for accepting an interface card;

packing said upper and lower plates to enclose said printed circuit board;

connecting an interface card to said interface trough;

using a controller to activate said interface card and generating input codes;

allowing said upper and lower plates to be unpacked if said input codes match with said predetermined codes; and erasing data stored in an integrated circuit on said printed circuit board if said input codes do not match with said predetermined codes.

* * * * *